(12) United States Patent
Kimura

(10) Patent No.: US 10,735,624 B2
(45) Date of Patent: Aug. 4, 2020

(54) INFORMATION PROCESSING APPARATUS THAT CAN BE SET BY A USER OPERATION TO LIMIT FUNCTIONS PROVIDED TO AN EXTERNAL APPARATUS SO AS TO INCLUDE A PRINTING FUNCTION BUT EXCLUDE A FILE SHARING FUNCTION, METHOD FOR CONTROLLING THE SAME, AND STORAGE MEDIUM

(71) Applicant: CANON KABUSHIKI KAISHA, Tokyo (JP)

(72) Inventor: Tomohiro Kimura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/273,226

(22) Filed: Feb. 12, 2019

(65) Prior Publication Data

US 2019/0253581 A1   Aug. 15, 2019

(30) Foreign Application Priority Data

Feb. 13, 2018 (JP) ................................. 2018-023408

(51) Int. Cl.
*G06F 3/12* (2006.01)
*H04N 1/327* (2006.01)
*H04N 1/00* (2006.01)
*H04N 1/333* (2006.01)

(52) U.S. Cl.
CPC ..... *H04N 1/32767* (2013.01); *H04N 1/00352* (2013.01); *H04N 1/33361* (2013.01)

(58) Field of Classification Search
CPC ........... H04N 1/32767; H04N 1/00352; H04N 1/33361; G06F 3/1205; G06F 3/1236; G06F 3/1253; G06F 3/1292; G06F 3/3234; G06F 3/3209
USPC .................................... 358/1.1–1.18
See application file for complete search history.

(56) References Cited

U.S. PATENT DOCUMENTS

| 7,983,402 B2* | 7/2011 | Ohara ............... G06F 21/608 358/1.15 |
| 8,913,280 B2 | 12/2014 | Kimura |
| 9,055,172 B2 | 6/2015 | Kimura |
| 9,535,485 B2 | 1/2017 | Kimura |
| 9,628,991 B2* | 4/2017 | Nakamura ........... H04L 63/205 |
| 10,108,379 B2 | 10/2018 | Kimura |

(Continued)

FOREIGN PATENT DOCUMENTS

JP    2007199827 A    8/2007

*Primary Examiner* — Gabriel I Garcia
(74) *Attorney, Agent, or Firm* — Venable LLP

(57) ABSTRACT

An information processing apparatus (printing apparatus) provides a service to an external apparatus via a communication line. A first communication unit performs communication via a first communication line. A second communication unit performs communication via a second communication line that is different from the first communication line. A provision unit provides a user interface for accepting, from a user, a setting that limits services that are to be provided via the second communication line. A limitation unit limits services that are to be provided via the second communication line, to one or more services out of a plurality of services that the information processing apparatus can provide, according to the setting accepted via the user interface.

4 Claims, 5 Drawing Sheets

(56) References Cited

U.S. PATENT DOCUMENTS 10,178,642 B1 * 1/2019 Posner ................. H04W 60/04
2007/0174441 A1 7/2007 Okamoto et al.

* cited by examiner

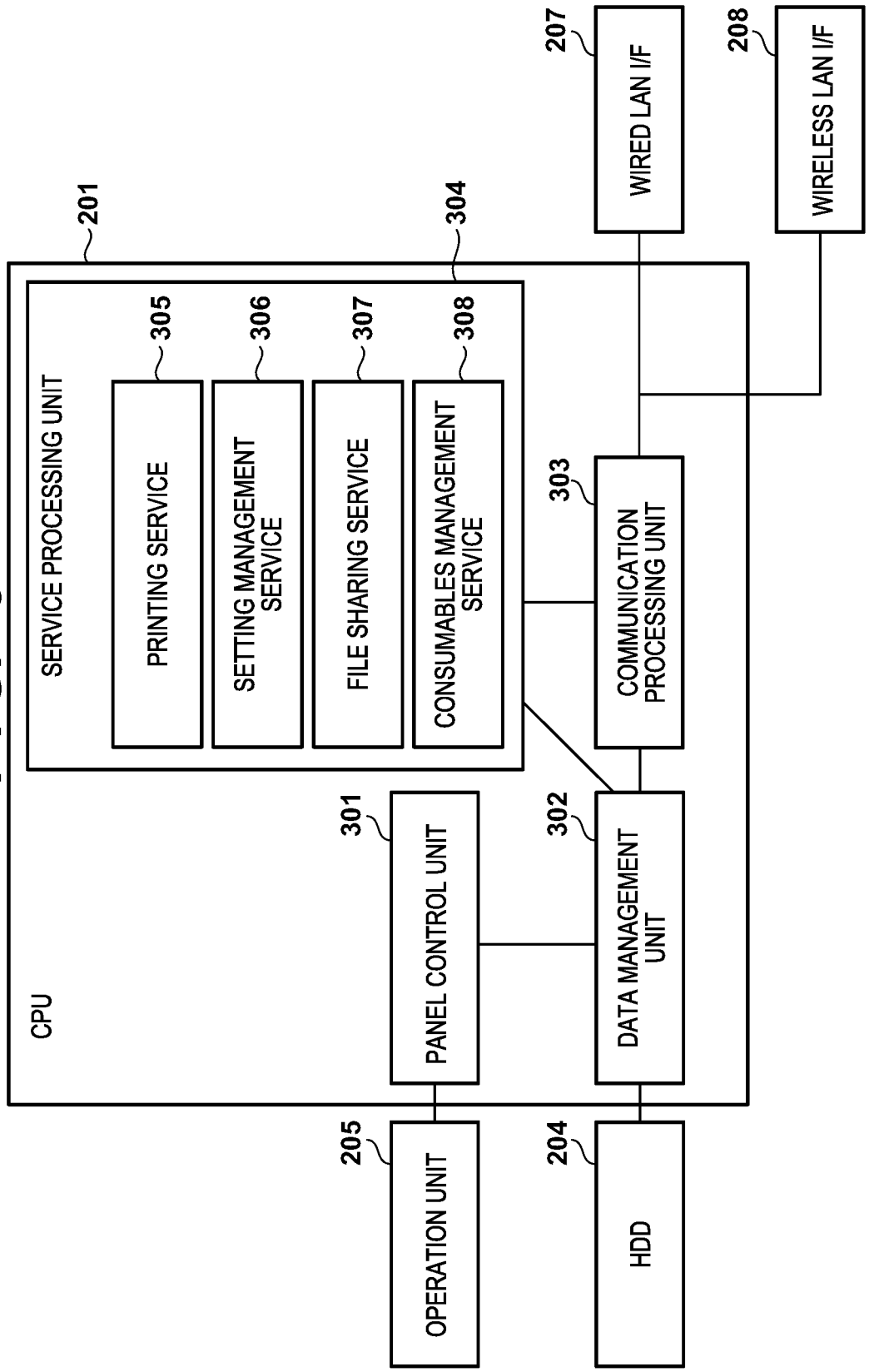

INFORMATION PROCESSING APPARATUS THAT CAN BE SET BY A USER OPERATION TO LIMIT FUNCTIONS PROVIDED TO AN EXTERNAL APPARATUS SO AS TO INCLUDE A PRINTING FUNCTION BUT EXCLUDE A FILE SHARING FUNCTION, METHOD FOR CONTROLLING THE SAME, AND STORAGE MEDIUM

BACKGROUND OF THE INVENTION

Field of the Invention

The present invention relates to an information processing apparatus, a method for controlling the same, and a storage medium.

Description of the Related Art

There is a known technology called "multi-home" that enables an information processing apparatus such as a printing apparatus to be provided with a plurality of communication interfaces (I/Fs) and operate in two or more networks. An information processing apparatus installed in a multi-home environment can provide services to a plurality of networks connected thereto. Therefore, it is possible to provide services to a plurality of networks, using a single information processing apparatus, without individually installing an information processing apparatus that provides services in each network. Japanese Patent Laid-Open No. 2007-199827 proposes technology that enables a printing apparatus installed in a multi-home environment to provide a printing service and so on to a plurality of networks.

Generally, a different operation policy is applied to each of a plurality of communication lines (e.g. a main line and a sub line) connected to an information processing apparatus installed in a multi-home environment as described above. According to such operation policies, for example, setting is performed such that a printing service (a printing function) is to be provided using both the main line and the sub line while a file sharing service (a file server function) is to be provided using only the main line.

However, above-described setting is performed using a port filter function or the like, which requires complex user operations. If a user performs incorrect setting, a security problem may occur. For example, a service that should be provided using only the main line may be used by an external apparatus via the sub line. Therefore, it is desirable that a user can more easily set services (functions) that are to be provided by an information processing apparatus via communication lines.

SUMMARY OF THE INVENTION

The present invention is made in view of the above-described problem, and provides technology that allows a user to more easily and appropriately perform setting for services (functions) that an information processing apparatus connected to a plurality of communication lines provides via the individual communication lines.

According to one aspect of the present invention, there is provided an information processing apparatus that provides a service to an external apparatus via a communication line, the information processing apparatus comprising: a first communication unit configured to perform communication via a first communication line; a second communication unit configured to perform communication via a second communication line that is different from the first communication line; a provision unit configured to provide a user interface for accepting, from a user, a setting that limits services that are to be provided via the second communication line; and a limitation unit configured to limit services that are to be provided via the second communication line, to one or more services out of a plurality of services that the information processing apparatus can provide, according to the setting accepted via the user interface.

According to another aspect of the present invention, there is provided a method for controlling an information processing apparatus that provides a service to an external apparatus via a communication line, the method comprising: performing communication via a first communication line; performing communication via a second communication line that is different from the first communication line; providing a user interface for accepting, from a user, a setting that limits services that are to be provided via the second communication line; and limiting services that are to be provided via the second communication line, to one or more services out of a plurality of services that the information processing apparatus can provide, according to the setting accepted via the user interface.

According to still another aspect of the present invention, there is provided a non-transitory computer-readable storage medium storing a computer program for causing a computer to execute a method for controlling an information processing apparatus that provides a service to an external apparatus via a communication line, the method comprising: performing communication via a first communication line; performing communication via a second communication line that is different from the first communication line; providing a user interface for accepting, from a user, a setting that limits services that are to be provided via the second communication line; and limiting services that are to be provided via the second communication line, to one or more services out of a plurality of services that the information processing apparatus can provide, according to the setting accepted via the user interface.

The present invention allows a user to more easily and appropriately perform setting for services that an information processing apparatus connected to a plurality of communication lines provides via the individual communication lines.

Further features of the present invention will become apparent from the following description of exemplary embodiments (with reference to the attached drawings).

BRIEF DESCRIPTION OF THE DRAWINGS

FIG. 3 is a block diagram showing an example of a software configuration of the printing apparatus.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

System Configuration

Figure 1:
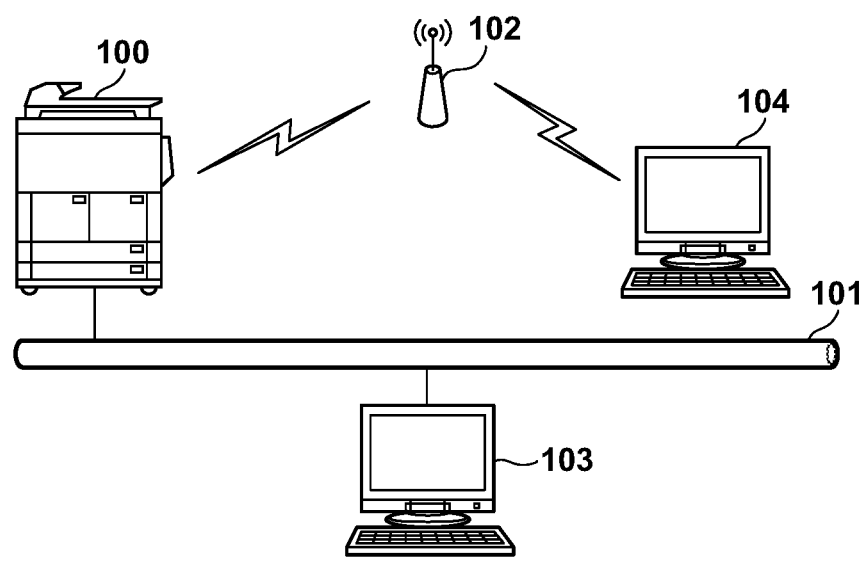
FIG. 1 shows an example of a configuration of a communication system.

FIG. 1 is a diagram showing an example of a configuration of a communication system according to a first embodiment. In the communication system shown in FIG. 1, a printing apparatus 100 is connected to a PC 103 via a wired LAN (local area network) 101. The wired LAN 101 is, for example, a network complying with Ethernet™ standards. The printing apparatus 100 is also connected to a PC 104 via a wireless access point 102. The printing apparatus 100 provides various services to the PC 103 and the PC 104 as described below. In the present embodiment, the printing apparatus 100 is an example of an information processing apparatus that provides services to an external apparatus via a communication line.

Hardware Configuration of Printing Apparatus

Figure 2:
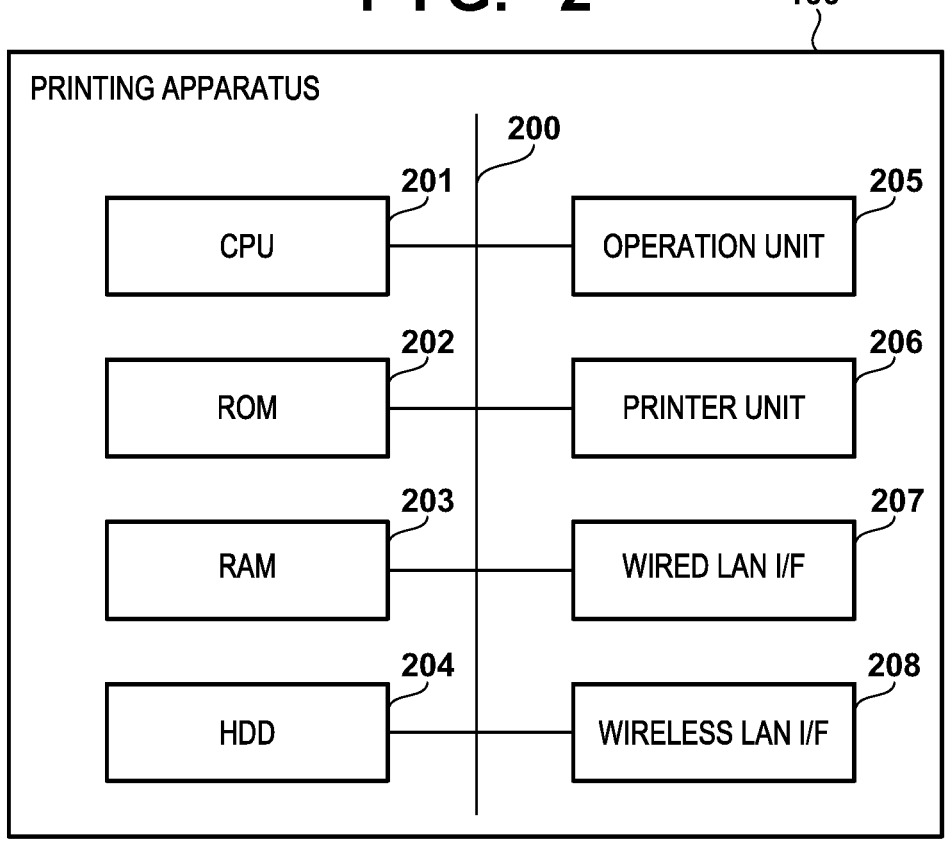
FIG. 2 is a block diagram showing an example of a hardware configuration of a printing apparatus.

FIG. 2 is a block diagram showing an example of a hardware configuration of the printing apparatus 100. The printing apparatus 100 includes a CPU 201, a ROM 202, a RAM 203, an HDD (hard disk drive) 204, an operation unit 205, a printer unit 206, a wired LAN I/F (interface) 207, and a wireless LAN I/F 208. These devices included in the printing apparatus 100 are connected via a system bus 200 so as to be able to exchange data with each other.

The CPU 201 controls overall operations of the printing apparatus 100. The CPU 201 performs various kinds of control such as printing control by reading out and executing control programs stored in the ROM 202. The RAM 203 is a volatile memory that is used as a work area or the like for the CPU 201. The HDD 204 is a storage device that stores various kinds of data such as image data and setting data, and various kinds of programs. The operation unit 205 includes a display (display unit) that has a touch panel function. A user inputs instructions and information into the printing apparatus 100 via the operation unit 205 according to an operation screen displayed on the display. The printer unit 206 prints an image on a sheet based on image data transferred thereto via the system bus 200.

The printing apparatus 100 includes a plurality of communication I/Fs that respectively perform communication via different communication lines, and thus operates in two or more networks. Although the present embodiment describes an example in which the printing apparatus 100 includes the wired LAN I/F 207 and the wireless LAN I/F 208, the printing apparatus 100 may include any combination of communication I/Fs other than such a combination. For example, the printing apparatus 100 may include a plurality of communication I/Fs of either one type (wired LAN I/Fs or wireless LAN I/Fs). Also, each communication I/F is not necessarily a physical I/F, and may be a logical I/F such as a virtual I/F that is realized at a software level.

In the present embodiment, the printing apparatus 100 uses, from among a plurality of communication lines, a communication line to which the wired LAN I/F 207 is connected, as a main line (a first communication line), and a communication line to which the wireless LAN I/F 208 is connected, as a sub line (a second communication line). That is, the wired LAN I/F 207 functions as an example of a first communication unit that performs communication via a first communication line, and the wireless LAN I/F 208 functions as an example of a second communication line that performs communication via a second communication line that is different from the first communication line.

The wired LAN I/F 207 is connected to the wired LAN 101, and can communicate with an external apparatus such as the PC 103 via the wired LAN 101. The wireless LAN I/F 208 performs wireless communication complying with wireless LAN standards such as IEEE 802.11a/b/g/n/ac. In the present embodiment, the wireless LAN I/F 208 can wirelessly connect to the wireless access point 102 that complies with wireless LAN standards, and communicate with an external apparatus such as the PC 104 via the wireless access point 102. By communicating with an external apparatus, the printing apparatus 100 can receive various kinds of instructions such as a print instruction and a setting instruction from the external apparatus.

Software Configuration of Printing Apparatus

FIG. 3 is a block diagram showing an example of a software configuration of the printing apparatus 100. The functional units in the CPU 201 shown in FIG. 3 are realized in the CPU 201 by the CPU 201 reading out and executing a control program stored in the ROM 202 or the HDD 204. The printing apparatus 100 includes a panel control unit 301, a data management unit 302, a communication processing unit 303, and a service processing unit 304 as functional units that are realized in the CPU 201. Note that at least one of the panel control unit 301, the data management unit 302, the communication processing unit 303, and the service processing unit 304 may be realized using a hardware circuit such as an ASIC or an FPGA. ASIC is an abbreviation of Application Specific Integrated Circuit. FPGA is an abbreviation of Field-Programmable Gate Array.

The panel control unit 301 processes input to, and output from, the operation unit 205. For example, the panel control unit 301 outputs setting information regarding each communication I/F, received from the operation unit 205, to the data management unit 302, thereby causing the setting information to be stored in a storage device such as the HDD 204. The panel control unit 301 also performs processing to display a screen on the operation unit 205 based on screen data acquired from the data management unit 302, and processing to notify the functional units of event information received from the operation unit 205. The data management unit 302 processes inputs to, and outputs from, a storage device such as the ROM 202 or the HDD 204 according to requests from the functional units.

The communication processing unit 303 controls the wired LAN I/F 207 and the wireless LAN I/F 208, thereby controlling communication with an external apparatus via the wired LAN 101 or the wireless access point 102. For example, the communication processing unit 303 establishes a connection with the PC 103 or the PC 104 to perform data transmission/reception. Also, the communication processing unit 303 uses the data management unit 302 to read out setting information regarding the communication I/Fs from a storage device, and executes setting according to the setting information thus read out.

The service processing unit 304 realizes various kinds of services that are to be provided by the printing apparatus 100. In the present embodiment, as shown in FIG. 3, the printing apparatus 100 provides a printing service 305, a setting management service 306, a file sharing service 307, and a consumables management service 308. Note that the services shown in FIG. 3 are examples, and the printing apparatus 100 may provide services other than the services shown in FIG. 3.

The printing service 305 provides a printing function, using a printer control protocol such as LPD (Line Printer Daemon). The printing service 305 receives a print instruction from an external apparatus via the communication processing unit 303, and stores in the HDD 204 print data, which is included in the print instruction, using the data management unit 302. The printing service 305 reads out print data stored in the HDD 204, and causes the printer unit 206 to perform printing processing based on the print data.

The setting management service 306 provides an external apparatus with the function of inputting/outputting setting information regarding the printing apparatus 100 thereto/therefrom, using a communication protocol for apparatus management, such as SNMP (Simple Network Management Protocol). The setting management service 306 receives a write request or acquisition request from an external apparatus, regarding the setting information of the printing apparatus 100, via the communication processing unit 303. Furthermore, the setting management service 306 interprets the content of the received request, and executes reading and writing on setting data for the printing apparatus 100, stored in a storage device such as the HDD 204, via the data management unit 302. For example, if the setting management service 306 receives an acquisition request regarding setting information, the setting management service 306 transmits a response including setting information acquired via the data management unit 302, to the external apparatus that issued the request.

The file sharing service 307 provides a file sharing function, which is the function of sharing a file with an external apparatus, using a file sharing protocol such as SMB (Service Message Block). The consumables management service 308 provides the function of transmitting information regarding a consumable to an external apparatus, using a content transfer protocol such as HTTP (Hypertext Transfer Protocol). Information regarding a consumable is, for example, information indicating the remaining amount of a consumable such as toner used by the printer unit 206 to perform printing processing.

Examples of Setting Screens

Figure 4A:
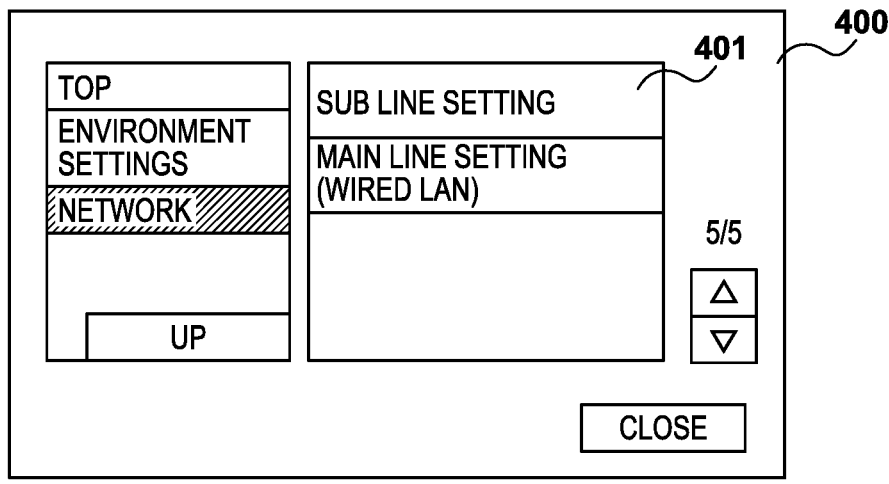
FIGS. 4A to 4C are diagrams showing examples of setting screens for performing sub line setting for the printing apparatus.
Figure 4B:
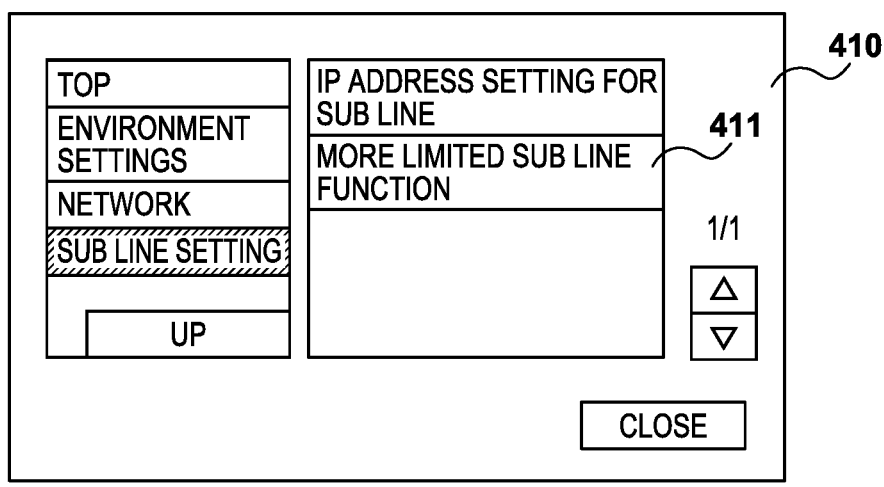
Figure 4C:
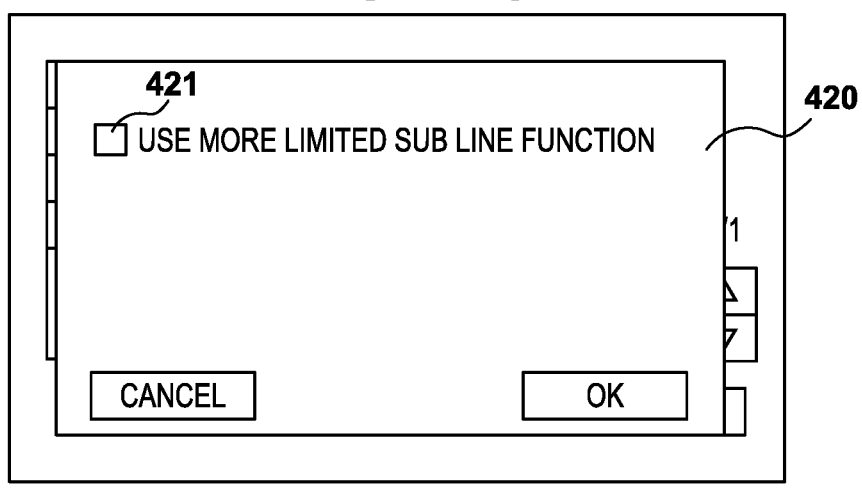

FIGS. 4A to 4C are examples of operation screens that are displayed on the operation unit 205 and function as user interfaces (UIs) for the printing apparatus 100. Note that it is possible to provide, via a wired or wireless network, an external apparatus with a UI by providing the external apparatus with screen data corresponding to a web-based screen that can be displayed and operated at the external apparatus using a web browser.

The following describes a case in which a user performs sub line setting as network setting for the printing apparatus 100. In accordance with a user operation input from the operation unit 205, the CPU 201 displays a setting screen 400, which is shown in FIG. 4A, on the operation unit 205. The setting screen 400 is an operation screen for performing network setting related to a communication function that is achieved by the communication processing unit 303 of the printing apparatus 100. A user can select a setting for a sub line as a setting item, by pressing a selection button 401 on the setting screen 400.

Upon the selection button 401 on the setting screen 400 being pressed, the CPU 201 displays a setting screen 410, which is shown in FIG. 4B, on the operation unit 205. The setting screen 410 is an operation screen for selecting a setting item related to a sub line for the printing apparatus 100. A user can select a setting for a function of the sub line (a service provided via the sub line) by pressing a selection button 411 on the setting screen 410.

In the present embodiment, upon the selection button 411 on the setting screen 410 being pressed, the CPU 201 pops up a setting window 420, which is shown in FIG. 4C, on the operation unit 205. The setting window 420 allows a user to perform setting regarding whether or not to limit the functions (services) provided by the printing apparatus 100 via the sub line, to specific functions. A user can limit the functions provided by the printing apparatus 100 via the sub line, to specific functions, by selecting a setting button 421 on the setting window 420.

If a user presses an OK button without selecting the setting button 421, the printing apparatus 100 operates without limiting the functions provided via the sub line, to specific functions. That is, the CPU 201 provides, out of a plurality of services that are provided by the service processing unit 304, services that are provided via the main line (the first communication line), via the sub line (the second communication line) as well. On the other hand, if a user selects the setting button 421 and then presses the OK button, the CPU 201 operates while limiting the functions that are to be provided via the sub line only to specific functions.

For example, the printing apparatus 100 makes all of the services (from the printing service 305 to the consumables management service 308) shown in FIG. 3 available via the main line. On the other hand, the printing apparatus 100 limits services that are available via the sub line only to the printing service 305, the setting management service 306, and the consumables management service 308. That is, the printing apparatus 100 stops providing the file sharing service 307 via the sub line, so that the file sharing service 307 is unavailable.

Note that, specific functions (services) that are to be provided via the sub line when the setting button 421 is selected may be able to be changed in accordance with a user operation. In such a case, the CPU 201 may display a setting screen for accepting a change made to services provided via the sub line, on the operation unit 205, in accordance with a user operation, and accept a changing operation. That is, the CPU 201 may set the above-described specific services according to a user operation made on the operation unit 205.

Processing Procedures

In the printing apparatus 100 according to the present embodiment, the CPU 201 provides UIs for accepting, from a user, settings for limiting services that are to be provided via the sub line. In the present embodiment, the UIs are provided by the printing apparatus 100 displaying setting screens on the operation unit 205 as shown in FIGS. 4A to 4C. Note that a UI may be provided to an external apparatus by providing screen data, which is data for displaying setting screens using a web browser, to the external apparatus, via the main line or the sub line. In such a case, the CPU 201 receives data accepted by an external apparatus via the UI thus provided, from the external apparatus via the main line or the sub line.

The CPU 201 limits services that are to be provided via the sub line to some of the plurality of services that can be provided by the printing apparatus 100, according to settings accepted from a user via the UIs as described above. Through such processing, a user is allowed to more easily and appropriately perform setting for services that the printing apparatus 100 connected to a plurality of communication lines provides via the individual communication lines.

Figure 5:
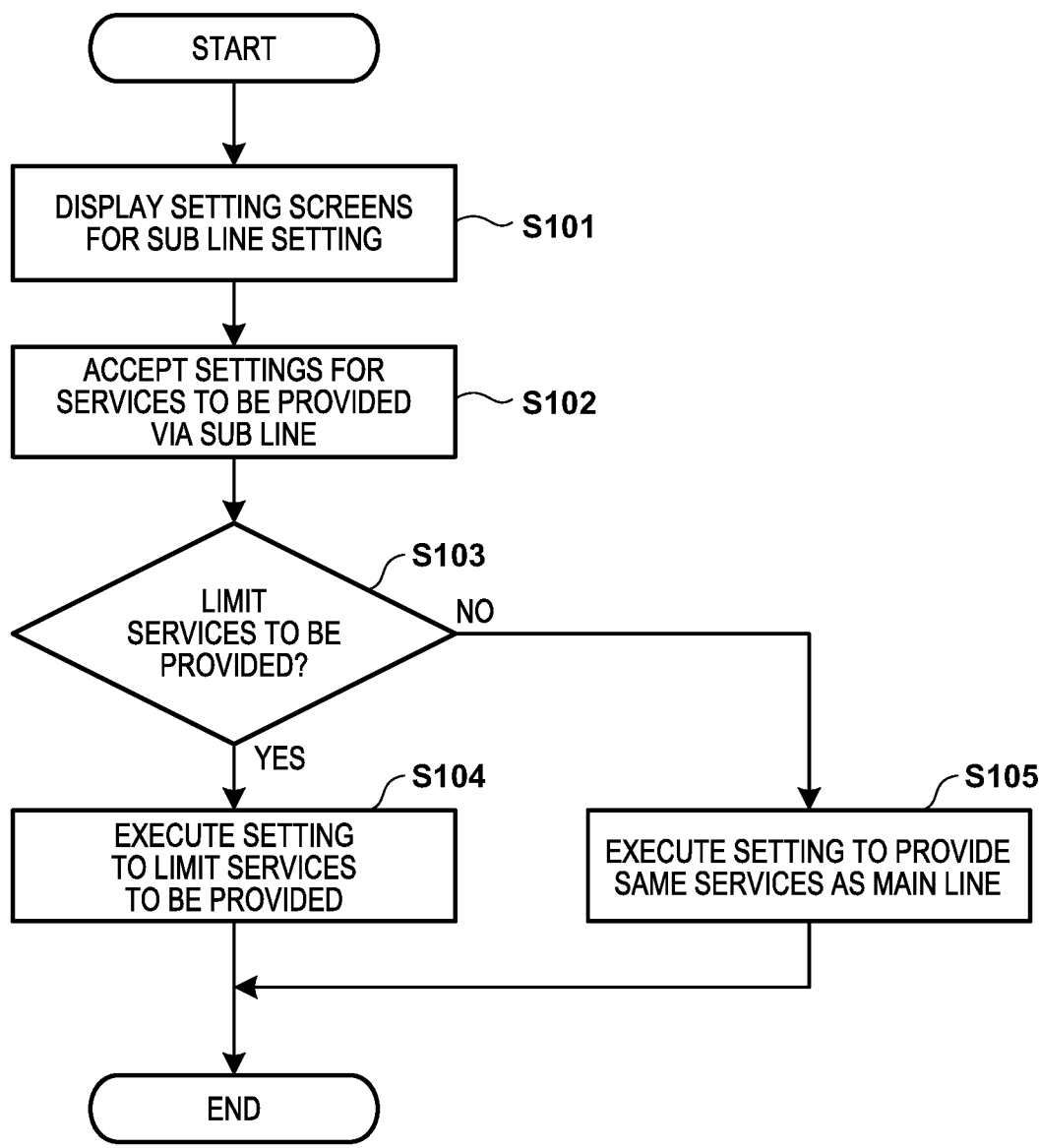
FIG. 5 is a flowchart for processing procedures for setting the sub line for the printing apparatus.

FIG. 5 is a flowchart showing processing procedures for setting a sub line for the printing apparatus 100. Processing performed in each step shown in FIG. 5 can realized in the printing apparatus 100, by the CPU 201 reading out and executing control programs stored in the ROM 202 or the HDD 204.

In step S101, the CPU 201 displays, on the operation unit 205, setting screens (FIGS. 4A to 4C) for sub line setting, as UIs for accepting, from a user, settings for limiting services that are to be provided via the sub line. After displaying the setting screens, the CPU 201, in step S102, accepts a user operation via an operation screen displayed on the operation unit 205, thereby accepting settings for services that are to be provided via the sub line.

Next, in step S103, the CPU 201 determines whether or not to limit services that are to be provided via the sub line, in accordance with the settings accepted via the setting screens. For example, if the setting button 421 on the setting window 420 is selected, the CPU 201 advances processing to step S104, and executes setting to limit services that are to be provided via the sub line. Specifically, the CPU 201 executes setting to limit services that are to be provided via the sub line, to specific services (e.g. the printing service 305). The CPU 201 sets services that are to be respectively provided via the main line and the sub line such that, for example, the CPU 201 provides the printing service 305 via the main line and the sub line, and does not provide the file sharing service 307 via the sub line. Thus, the CPU 201 starts providing limited services via the sub line.

On the other hand, if setting for limiting services that are to be provided via the sub line has not been performed on the setting screens (e.g. sub line setting has been ended without selecting the setting button 421), the CPU 201 advances processing from step S103 to step S105. In step S105, the CPU 201 executes setting to provide, via the sub line, the same services as the services that are to be provided via the main line. Thus, the CPU 201 starts providing, via the sub line, the same services as services that are to be provided via the main line. Upon setting in step S104 or S105 being complete, the CPU 201 ends sub line setting.

As described above, the printing apparatus 100 according to the present embodiment provides a user with UIs for accepting settings for limiting services that are to be provided via the sub line (the second communication line), and performs sub line setting according to the settings accepted via the UIs. Accordingly, a user can set services that the printing apparatus 100 connected to a plurality of communication lines (i.e. installed in a multi-home environment) provides via the individual communication lines, without requiring a user to perform complex operations. Thus, a user can more easily and appropriately set services that the printing apparatus 100 provides via the individual communication lines.

Second Embodiment

A second embodiment describes an example in which the printing apparatus 100 allows a user to arbitrarily select a function that is to be provided by the printing apparatus 100 via a sub line. Note that the following describes points that differ from the first embodiment.

Figure 6A:
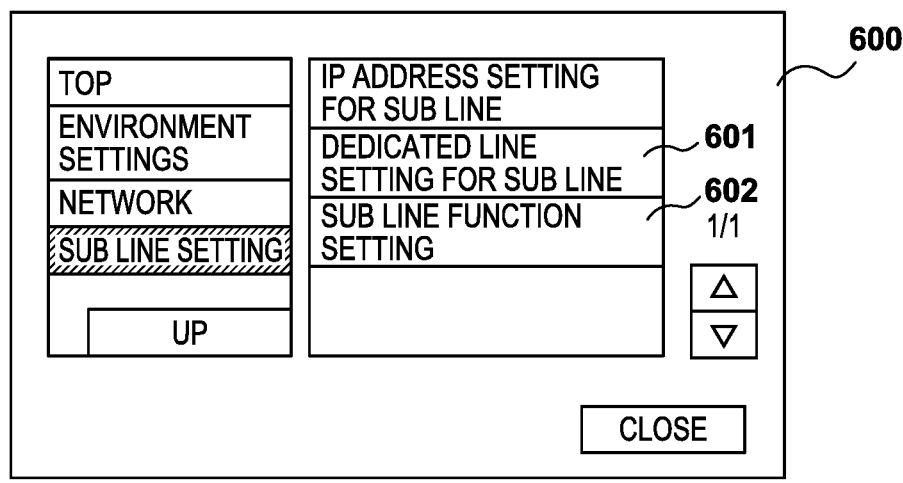
FIGS. 6A to 6C are diagrams showing examples of setting screens for performing sub line setting for the printing apparatus.
Figure 6B:
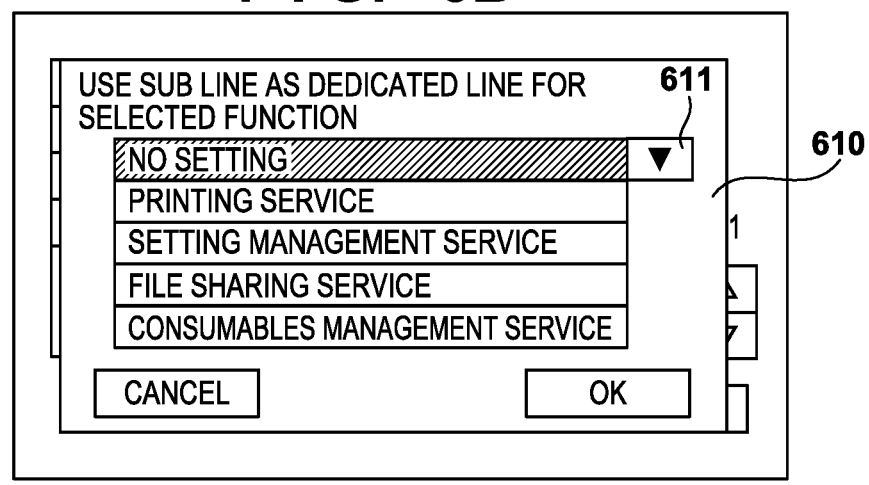
Figure 6C:
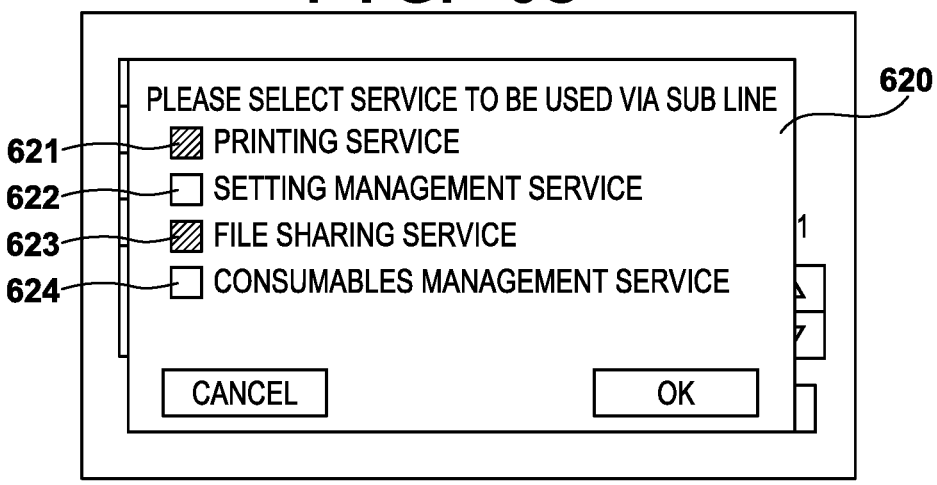

FIGS. 6A to 6C are examples of operation screens that are displayed on the operation unit 205 and function as UIs for the printing apparatus 100. Note that operation screens are not limited to those displayed on the operation unit 205, and it is possible to provide web-based UIs that can be displayed and operated at an external apparatus using a web browser, via a wired or wireless network.

In the present embodiment, upon the selection button 401 on the setting screen 400 shown in FIG. 4A being pressed, the CPU 201 displays a setting screen 600, which is shown in FIG. 6A, on the operation unit 205. Upon a selection button 601 on the setting screen 600, which is for selecting a dedicated line setting for the sub line, being pressed, the CPU 201 displays a setting screen 610, which is shown in FIG. 6B, on the operation unit 205. On the other hand, upon a selection button 602 on the setting screen 600, which is for selecting a function setting for the sub line, being pressed, the CPU 201 displays a setting screen 620, which is shown in FIG. 6C, on the operation unit 205. In this way, the CPU 201 provides the setting screen 610 or 620 to a user as a UI for accepting selection of one or more services that are to be provided via the sub line.

The setting screen 610 shown in FIG. 6B is an operation screen for performing setting to use the sub line as a dedicated line for providing a specific function (service). Using a pull-down menu 611 provided in the setting screen 610, a user can select a service that is to be provided by the printing apparatus 100 via the sub line. By selecting a service from the pull-down menu 611, a user can select a service that is to be provided by the printing apparatus 100 via the sub line. For example, if a user selects a printing service from the pull-down menu 611, the printing apparatus 100 provides only the printing service 305 via the sub line. If a user selects "no setting" from the pull-down menu 611, the printing apparatus 100 provides, via the sub line, the same services as those provided via the main line.

Note that, if a service displayed in the pull-down menu 611 is disabled from being set, the pull-down menu 611 may be displayed with the service being hidden or grayed out so that a user cannot select the service. That is, only enabled services of the printing apparatus 100 may be displayed in the pull-down menu 611 so as to be selectable. Alternatively, instead of the pull-down menu 611, a list of services may be displayed in the setting screen 610 so that a user can select a service.

If a setting using the setting screen 610 is accepted, the CPU 201 sets services that are to be provided via the main line and the sub line such that the sub line is used as a dedicated line for the service selected from the pull-down menu 611.

The setting screens 620 shown in FIG. 6C is a screen for allowing a user to arbitrarily select a function from among a plurality of functions (services) that are to be provided via the sub line. Using setting buttons 621 to 624 provided on the setting screens 620, which respectively correspond to services, a user can designate any one or more services. FIG. 6C shows an example in which the printing service 305 and the file sharing service 307 are designated using the setting buttons 621 and 623, as services that are to be provided via the sub line.

Note that, if any of the services corresponding to the setting buttons 621 to 624 are disabled from being set, the setting button corresponding to that service may be hidden or grayed out so that a user cannot select the services. That is, display of the setting buttons 621 to 624 may be controlled such that only the services that are enabled in the printing apparatus 100 are selectable.

If a setting using the setting screens 620 is accepted, the CPU 201 sets services that are to be provided via the main line and the sub line such that one or more services selected using the setting buttons 621 to 624 are to be provided via the sub line.

As described above, according to the present embodiment, as in the first embodiment, a user can set services that the printing apparatus 100 connected to a plurality of communication lines (i.e. installed in a multi-home environment) provides via the individual communication lines, without requiring a user to perform complex operations. Thus, a user can more easily and appropriately set services that the printing apparatus 100 provides via the individual communication lines.

Other Embodiments

In the above-described embodiments, in the LDAP obtainment processing in the case where the RUI is used, the MFP 1 causes the authentication information input screen 1420 to be displayed on the external apparatus (the PC 4) in step S801, and accepts input of authentication information from a user via the input screen 1420. However, while the user who was authenticated in the login processing (step S103) in the MFP 1 is logged in to the MFP 1, the authentication information that is stored in the HDD 204 may be used if logging in to the LDAP server 3 in accordance with an operation using the RUI. Accordingly, the convenience for the user who uses the MFP 1 may be improved.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-023408, filed Feb. 13, 2018, which is hereby incorporated by reference herein in its entirety.

What is claimed is:

1. An information processing apparatus that has a plurality of functions including: a sharing function of sharing with an external apparatus a file stored in a storage; and a printing function of receiving print data from an external apparatus, and performing printing based on the received print data, and that provides functions to an external apparatus, the information processing apparatus comprising:
    a first communication interface;
    a second communication interface that is different from the first communication interface;
    at least one memory that stores a set of instructions; and
    at least one processor that executes the instructions, the instructions, when executed, causing the information processing apparatus to perform operations comprising:
    displaying a screen including a displayed object for changing a set value that indicates whether or not to limit functions to be provided to an external apparatus via the second communication interface; and
    in a case where the set value that indicates to limit functions to be provided via the second communication interface is set based on a user operation for the displayed object, changing a network setting for the second communication interface such that the functions to be provided via the second communications interface are limited to, out of the plurality of functions, one or more specific functions that includes at least the printing function but does not include at least the sharing function.

2. The information processing apparatus according to claim 1,
    wherein the operations further comprise providing, to an external apparatus via the first communication interface or the second communication interface, screen data for displaying a setting screen for the setting, on a display unit of the information processing apparatus, or for displaying a setting screen for the setting, using a web browser.

3. A method for controlling an information processing apparatus that has a plurality of functions including: a sharing function of sharing with an external apparatus a file stored in a storage; and a printing function of receiving print data from an external apparatus, and performing printing based on the received print data, and that provides functions to an external apparatus, the method comprising:
    performing communication via a first communication interface;
    performing communication via a second communication interface that is different from the first communication interface;
    displaying a screen including a displayed object for changing a set value that indicates whether or not to limit functions to be provided to an external apparatus via the second communication interface; and
    in a case where the set value that indicates to limit functions to be provided via the second communication interface is set based on a user operation for the displayed object, changing a network setting for the second communication interface such that the functions to be provided via the second communication interface are limited to, out of the plurality of functions, one or more specific functions that includes at least the printing function but does not included at least the sharing function.

4. A non-transitory computer-readable storage medium storing a computer program for causing a computer to execute a method for controlling an information processing apparatus that has a plurality of functions including: a sharing function of sharing with an external apparatus a file stored in a storage; and a printing function of receiving print data from an external apparatus, and performing printing based on the received print data, and that provides functions to an external apparatus, the method comprising:

performing communication via a first communication interface;

performing communication via a second communication interface that is different from the first communication interface;

displaying a screen including a displayed object for changing a set value that indicates whether or not to limit functions to be provided to an external apparatus via the second communication interface; and in a case where the set value that indicates to limit functions to be provided via the second communication interface is set based on a user operation for the displayed object, changing a network setting for the second communication interface such that the functions to be provided via the second communication interface are limited to, out of the plurality of functions, one or more specific functions that includes at least the printing function but does not included at least the sharing function.

* * * * *